2 Sheets—Sheet 1.
G. O. SCHNELLER.
Water-Meters.
No. 196,483. Patented Oct. 23, 1877.
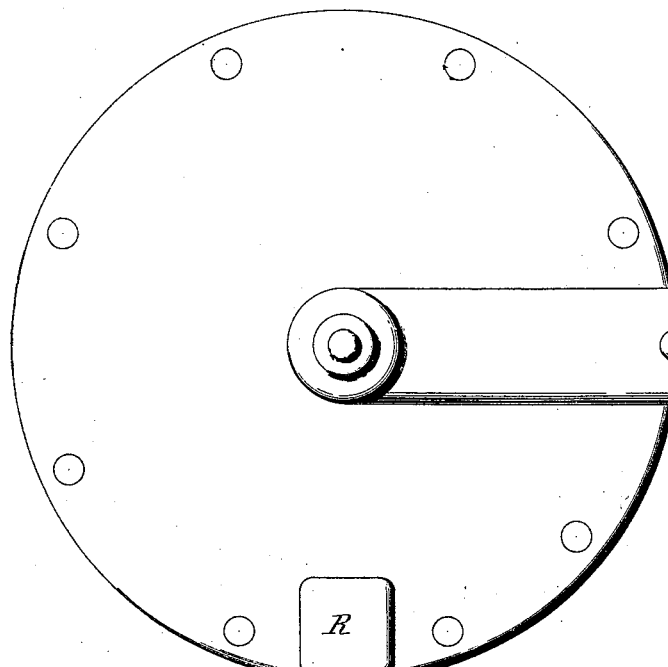
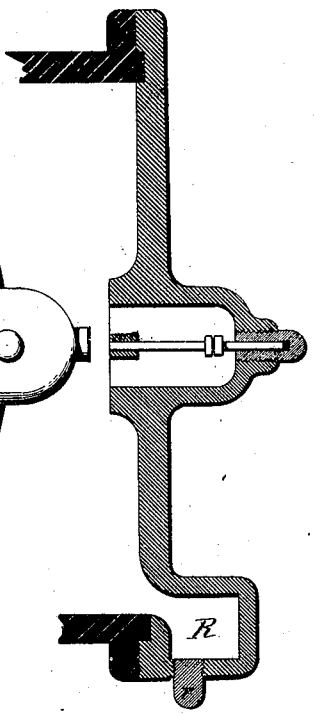
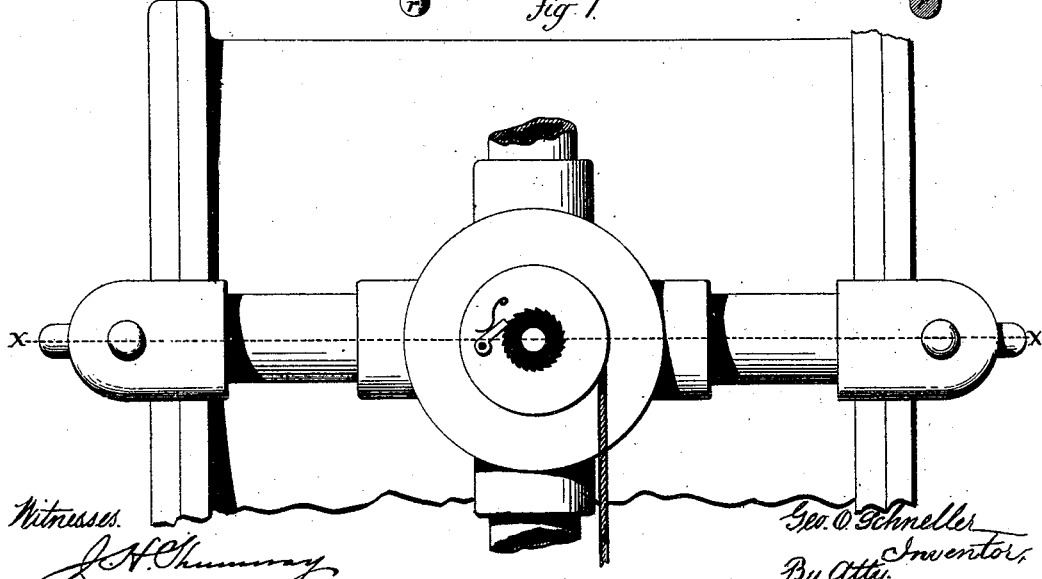

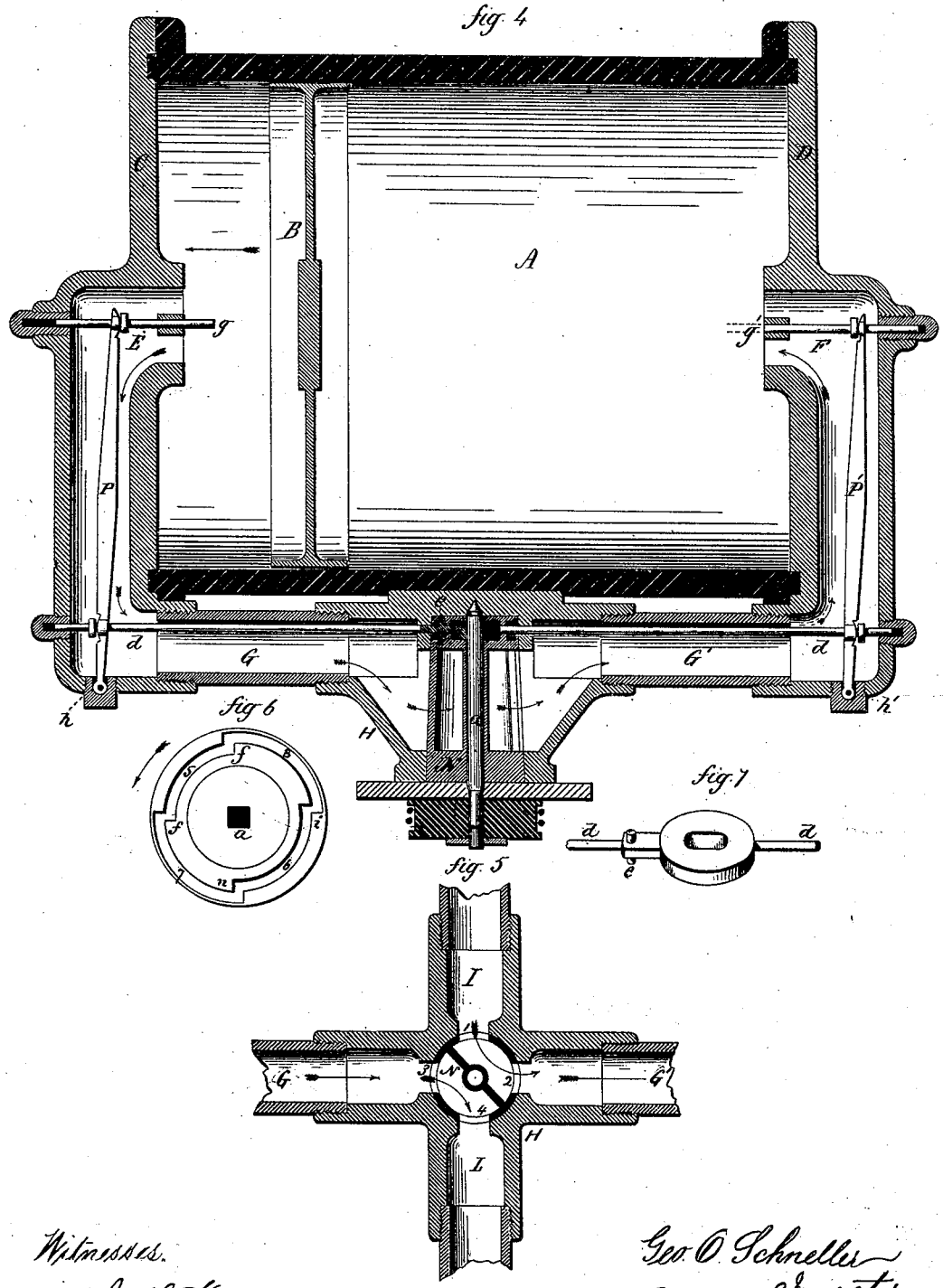

UNITED STATES PATENT OFFICE.

GEORGE O. SCHNELLER, OF HUNTINGTON, CONNECTICUT.

IMPROVEMENT IN WATER-METERS.

Specification forming part of Letters Patent No. 196,483, dated October 23, 1877; application filed March 17, 1877.

*To all whom it may concern:*

Be it known that I, GEORGE O. SCHNELLER, of Huntington, in the county of Fairfield and State of Connecticut, have invented a new Improvement in Liquid-Meters; and I do hereby declare the following, when taken in connection with the accompanying drawings and the letters of reference marked thereon, to be a full, clear, and exact description of the same, and which said drawings constitute part of this specification, and represent, in—

Figure 1, a partial side view; Fig. 2, an end view; Fig. 3, a vertical central section at one end; Fig. 4, a horizontal section on line $x\ x$ of Fig. 1; and in Figs. 5, 6, and 7, detached views.

This invention relates to an improvement in devices for automatically measuring flowing liquids, and known as "liquid-meters," with special reference to what are known as "piston-meters."

In the usual construction of this class of measuring devices, in which a valve is employed to change the course of the flowing liquid from one side of the piston to the other, the liquid itself is made the power to operate the valve. As the pressure must necessarily be variable, it follows that the operation of the valve will be proportionately uncertain, and when the pressure is greatly reduced, as when flowing from casks, the valve will frequently fail to operate, rendering the meter useless.

The object of this invention is principally to overcome this difficulty, and to produce a meter in which the valve shall be turned independently of the flowing liquid or the moving piston; and the invention consists in the construction of the meter, as hereinafter described, and as specially recited in the claims.

A represents the cylinder, the dimensions of which are proportionate to the size of the meter required. It is smoothly bored out, and a piston, B, fitted to the inner surface, so as to move freely from end to end of the cylinder. This piston may be made of any suitable material—the lighter the better—celluloid being preferable. The edge of the piston should be sufficiently broad to prevent its canting, so as to bind in its passage from one end to the other. The cylinder is closed by heads C D, the one, C, constructed with a passage, E, the other with a similar passage, F, opening into the cylinder at or near the center of the head. These passages both turn toward one side, and are respectively connected by the tube G G' with the valve-case H. This valve-case H is represented as detached in Fig. 5, G G' representing the same passages shown in Fig. 4, and which lead one to each end of the cylinder. Transversely to these passages is a third passage, I, which forms the inlet, and a fourth passage, L, which forms the outlet. Centrally between these several passages a cylindrical four-way cock, N, is arranged, preferably upon a shaft, *a*, so as to turn upon centers, and with the least possible friction consistent with a proper fitting of the valve. This shaft *a* extends outward through the case to afford a means for turning the valve, as hereinafter described.

Supposing the valve to stand as in Fig. 5, the liquid, flowing inward through the passage I, will pass through the opening 1 2 of the valve to the right, and through the passage F to the cylinder, forcing the piston to the opposite end. The piston having reached that point comes to a stop. Then, by turning the valve until the opening 1 be presented to the passage at the left, and the opening 2 to the inlet I, which will bring the opening 3 of the valve to the outlet-passage L, and the opening 4 of the valve to the passage G' from the right, the course of the inflowing liquid will be changed and pass to the left, through the passage G E, into the cylinder against the piston, and there being an outlet through the valve from the opposite side of the piston, the inflowing liquid will force the piston to return, and the liquid before it to flow out through the valve and outlet L until the piston in its return reaches the then outlet end of the cylinder, there stopping. Another fourth turn of the valve will bring the opening 1 to the outlet, and the opening 2 to the passage from the left, when the liquid at the left of the piston will be forced out by that flowing in at the right, and, so continuing, one-fourth revolution of the valve at the termination of each full movement of the piston will continue to change the flow from one side to the other of the piston, and the quantity of discharge may be ascertained by multiplying the capacity of the cylinder by the number of quarter-revolutions of the valve.

In order to automatically arrest and release the valve, so that it will turn just its quarter-revolution at each movement of the piston, there is attached to the valve-shaft, or formed therein in a plane at right angles to its axis, a groove, as seen in Fig. 6, which consists of four segments, 5 6 7 8, each segment concentric to the axis of the valve, and the two 5 and 6 of a less radius than the two 7 and 8, each occupying one-fourth of the circumference, and each joining the next at their ends, so as to form shoulders.

Through the passages G, or in other convenient position, a rod, $d$, is arranged in suitable bearings at the ends for support, and at the center this rod is provided with a stud, $e$, as seen in Fig. 7, which stud sets into the groove in the valve.

Now, supposing the valve to turn in the direction denoted by the arrow in Fig. 6, and the stud $e$ to rest against the shoulder $f$ between the two parts 5 and 8 of the groove, which is the portion shown in Fig. 1, this will hold the valve so long as the stud $e$ rests against that shoulder.

At the center of the ends of the cylinder a sliding bar, $g$, is arranged at one end, and $g'$ at the other. From this sliding bar $g$ a lever, P, extends down through the passage E, and hung in a fulcrum, $h$, below the rod $d$, and at the other end in the corresponding passage a similar lever, P', hung upon a corresponding fulcrum, $h'$. The levers P and P' are each in connection with their respective sliding bar $g$ and $g'$, and also each connected to the rod $d$, so that the longitudinal movement of the sliding bar $g$ outward from the cylinder will move the rod $d$ correspondingly; but a distance of less in proportion as the bearing of the rod $d$ is nearer to or farther from the fulcrum $h$, and such outward longitudinal movement of the bar $g$ and movement of the rod $d$ will force the opposite bar $g'$ inward, as denoted in broken lines; hence, as in Fig. 1, the piston, traveling to the left, will strike the end of the sliding bar $g$ and force it outward. This movement of the sliding bar $g$ will draw the stud $e$ away from the shoulder $f$, and into the groove 8. Then the valve will turn until the shoulder $i$ will come against the stud $e$, which is one-fourth turn, and be there arrested until the piston has traversed to the opposite end, and, striking the bar $g$ at that end, will move the rod $d$, drawing the stud $e$ inward to the groove 6, there allowing another one-fourth revolution of the valve, or until the shoulder $n$ strikes the stud $e$, and there the valve, being again arrested, reverses the flow before described, and so on to the full revolution of the valve, the piston at each end releasing the valve, so as to allow the independent power applied to the valve to give it its proper rotation; hence, the outward flow being permitted, the piston will traverse from end to end so long as the outward and inward flow continue.

The amount of power required to release the valve being almost imperceptible, it follows that a pressure a little more than sufficient to move the piston will be all that is required. In practice, a half-pound or one-foot pressure is found to be ample for the operation of the meter.

The power to move the valve may be any of the well-known powers, such as springs or weights, through a train of gearing, or otherwise, (here represented as by a weight with a cord wound upon a drum,) it only being essential to this invention that the power to operate the valve be independent of the in or out flowing liquid.

As in some cases, slight obstructions or sediment may form in the cylinder. A drip or receptacle is provided for such foreign matter at each end of the cylinder, as seen in Figs. 2 and 3. This consists of a chamber, R, opening into the cylinder, but deeper than the lowest point of the cylinder, as seen in Fig. 3. Into this the sediment would be forced by the sliding piston, and it may be drawn off through the plug $r$, or a suitable cock applied for the purpose.

Preferably there are employed duplicate grooves, in connection with the valve, one above the other, as seen in Fig. 4, and the stud $e$, projecting both sides the rod $d$, as seen in Fig. 7, to take a bearing upon the shoulder in both grooves, and thereby prevent the turning of the rod and lessen the friction which would otherwise exist.

In order that the rod may pass the shaft, a loop is formed in the rod, as seen in Fig. 7, so as to extend from the rod at one side of the shaft to, and connect with, the shaft at the other side.

It will be understood that the usual clock-work and dials are to be applied to indicate the number of full movements of the piston, and this may be made with the shaft of the valve, or any of the moving parts of the apparatus.

I claim—

1. In combination with the piston and water-ways of a double-acting liquid-meter, a valve and power, other than that of the flowing liquid, to impart to said valve an intermittent revolution, substantially as and for the purpose specified.

2. The combination, in a liquid-meter, of a cylinder, a piston arranged to reciprocate in said cylinder, a passage leading from the cylinder at each side of the said piston, a valve, in connection with both of said passages, to turn the flow alternately from one passage to the other, and means, substantially such as described, to impart to the said valve an intermittent movement independent of the flowing liquid, and an automatic stop between the said valve and the said piston, substantially as and for the purpose described.

3. The combination, in a liquid-meter, of a cylinder, a piston arranged to reciprocate in said cylinder, a passage leading from the cylinder at each side of the said piston, a valve, in connection with both of said passages, to turn the flow alternately from one passage to the other, and a drip or sediment receptacle at each end of, and below the lowest point of, the cylinder, with outlet for removal of sediment, substantially as and for the purpose described.

GEO. O. SCHNELLER.

Witnesses:
JOHN E. EARLE,
CLARA BROUGHTON.